Jan. 20, 1931. J. P. WALKER 1,789,613
SEPARATING BAFFLE FOR OIL AND GAS SEPARATORS
Filed March 19, 1928
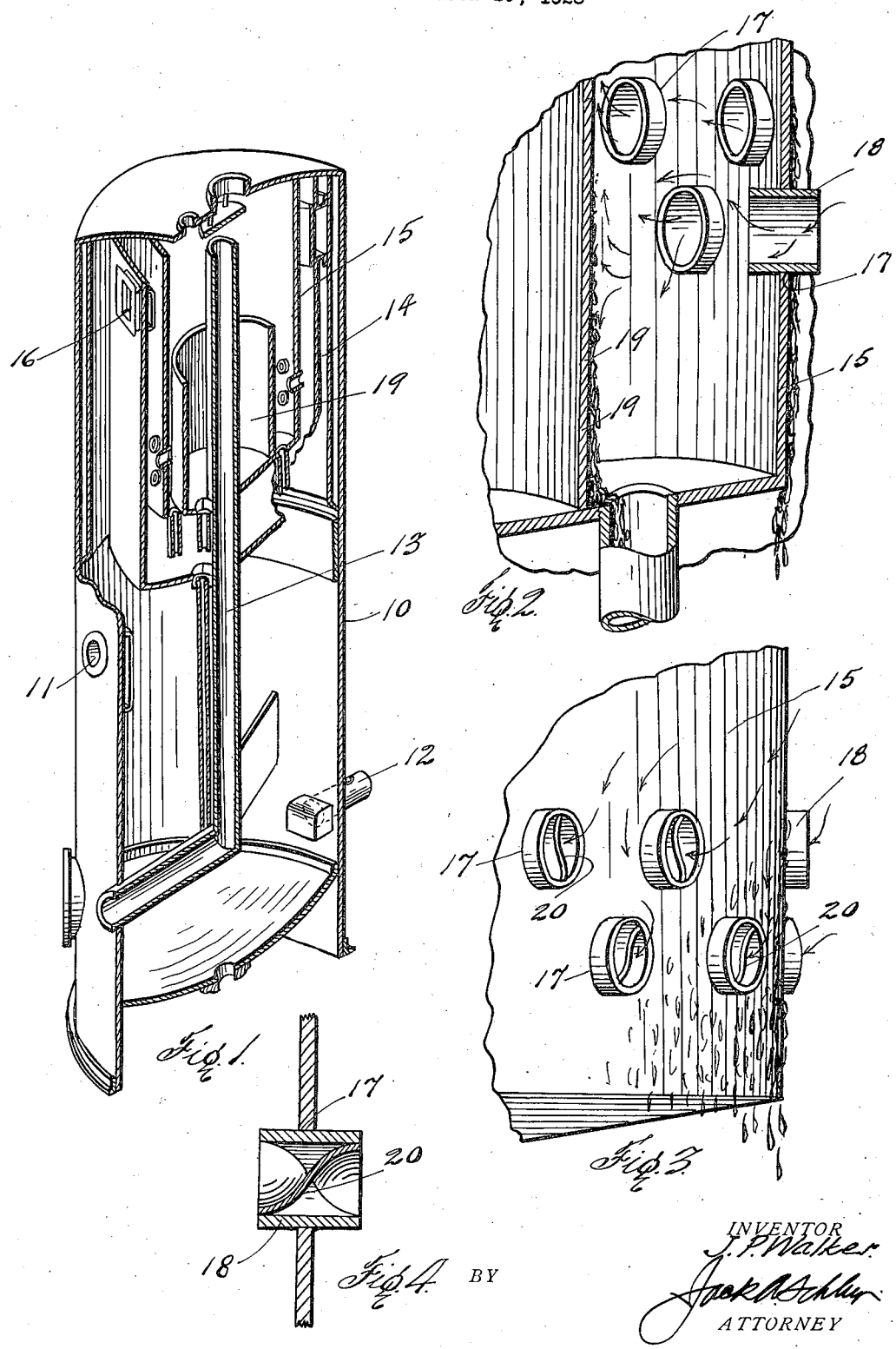
INVENTOR
J. P. Walker
BY
ATTORNEY Patented Jan. 20, 1931

1,789,613

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

SEPARATING BAFFLE FOR OIL AND GAS SEPARATORS

Application filed March 19, 1928. Serial No. 262,956.

This invention relates to new and useful improvements in separating baffles for oil and gas separators.

One object of the invention is to provide baffles for insertion in the fluid openings of a separator shell, whereby the liquids flowing down the inner and outer surfaces of the shell are deflected from the openings and also whereby the fluids are compelled to surmount the baffles before gaining access to the passages therethrough and thus causing a further separation of the liquids.

A further object of the invention is to provide tubular baffles inserted through the wall of an outer shell, whereby the fluids passing through said baffles are directed against the inner shell and thus thoroughly scrubbed and also whereby the liquids flowing down the outer shell are diverted from the passages therethrough.

Another object of the invention is to provide tubular baffles having twisted vanes therein, whereby fluids passing therethrough are scrubbed and the liquids deleted, and also whereby the fluid is given a whirling motion and its velocity is increased.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a vertical sectional view of a typical oil and gas separator equipped with baffles constructed in accordance with the invention, Fig. 2 is a sectional detail showing the baffles in place, together with the scrubbing shells, Fig. 3 is a detail showing the baffles equipped with vanes, and Fig. 4 is a sectional detail showing one of the baffles illustrated in Fig. 3.

In the drawings the numeral 10 designates an ordinary separator tank having an influent inlet 11 at mid-height and an oil outlet 12 near its bottom, together with a gas discharge pipe 13. Within the upper portion of the tank is mounted an outer scrubbing shell 14 and an inner scrubbing shell 15 spaced therefrom. The outer shell has inlets near its top.

The fluids which rise in the tank from the inlet 11 pass upward and enter the shell 14 through the opening 16. These fluids which, to a large extent, are gas include also a proportion of oil or liquid in the form of globules and as they pass downwardly in a helical course around the shell 15, they are scrubbed against the outer surface of said shell with the result that the liquids tend to adhere and trickle down the outer surface of said shell.

As it is desirable to still further scrub the fluids and extract as much liquid as possible, openings 17 are provided in the shell 15 near its bottom so that the gaseous fluids may enter the shell for further treatment. It is not desirable, however, to have the liquids which have been extracted and are passing down the outer surface of the shell 15 carried through said openings. I, therefore, insert tubular baffles 18 in said openings which are secured to the shell intermediate their ends so as to project from both the inner and outer surfaces of said shell. It will be seen that the liquids will be caused to flow around the outer projections of said baffles and also that those fluids flowing contiguous to the outer surface of the shell must pass outward and over the edges of said baffles in order to enter the same, thereby going through an additional scrubbing.

Owing to the reduced diameter of the baffle, the velocity of the flowing fluids will be increased and said fluids will be directed against the outer wall of a concentric deflector 19 disposed within the shell, whereby a further scrubbing and extraction of liquids will be carried out. Liquids flowing down the inner surface of the shell 15 will be deflected out of the path of the inflowing fluids by the baffles 18.

In Figs. 3 and 4 I have shown a twisted vane 20 fastened in each baffle 18 and such vanes will obstruct the passage of the fluids and cause them to take a helical course.

This will cause an additional scrubbing and extraction of the liquids and will give to the fluids a whirling motion which will enhance the scrubbing action, both in the baffle and against the wall of the deflector 19.

Various changes in the size and shape of the different parts, as well as modifications and alterations, may be made within the scope of the appended claims.

What I claim, is:

1. The combination in an oil and gas separator, of a tank, a vertical scrubbing shell within the tank closed at its upper end and having openings at its lower portion, an imperforate vertical deflector disposed within said shell, tubular baffles surrounding said openings and projecting from the outer and inner surfaces of the shell at an angle to the tank wall with the inner end of said baffles spaced from the deflector sufficiently to permit entrained gas to escape before striking the deflector, and a gas discharge communicating with the space surrounding said deflector.

2. The combination defined by claim 1, with the tubular baffles provided with twisted vanes disposed within the same.

In testimony whereof I affix my signature.

JAY P. WALKER.